(12) United States Patent
von Lillienskjold et al.

(10) Patent No.: US 8,141,841 B2
(45) Date of Patent: Mar. 27, 2012

(54) MACHINE FOOT

(75) Inventors: Lars von Lillienskjold, Hjørring (DK); Knud Nygaard, Nørresundby (DK)

(73) Assignee: NGI ApS, Norresundby (DK)

( * ) Notice: Subject to any disclaimer, the term of this patent is extended or adjusted under 35 U.S.C. 154(b) by 240 days.

(21) Appl. No.: 12/597,933

(22) PCT Filed: Mar. 28, 2008

(86) PCT No.: PCT/DK2008/000121
§ 371 (c)(1),
(2), (4) Date: Dec. 2, 2009

(87) PCT Pub. No.: WO2008/135044
PCT Pub. Date: Nov. 13, 2008

(65) Prior Publication Data
US 2010/0127151 A1    May 27, 2010

(30) Foreign Application Priority Data
May 3, 2007    (DK) .................................. 2007 00666

(51) Int. Cl.
*F16M 11/00*    (2006.01)

(52) U.S. Cl. ..................................... 248/677; 248/188.8

(58) Field of Classification Search ............... 248/649, 248/650, 6, 77, 678, 188, 188.1, 188.8, 188.9, 248/673, 677, 615, 288.31; 182/108, 111, 182/186.2, 221, 226
See application file for complete search history.

(56) References Cited

U.S. PATENT DOCUMENTS 4,738,436 A * 4/1988 Loggers ........................ 267/150
6,418,578 B1 * 7/2002 Polevoy et al. ................ 5/200.1
(Continued)

FOREIGN PATENT DOCUMENTS

DE    3437073 A1    4/1986
(Continued)

OTHER PUBLICATIONS

International Search Report.

*Primary Examiner* — Tan Le
(74) *Attorney, Agent, or Firm* — William J. Sapone; Coleman Sudol Sapone P.C.

(57) ABSTRACT

The invention includes a method for manufacturing a machine foot (1) and a machine foot (1). A machine foot (1) of the present type consists of a spindle (8), which is in the top screwn into the device which is to be supported and is in the bottom fastened to a base part (20). The spindle (8) can be turned in relation to the base part (20) in an angle (10). It is characteristic of the invention that the spindle (8) in the end, which is situated in the base part (20) is enclosed by a ball part (6,7), which consists of an upper part (7) and a lower part (6) and is fastened to the ball part (6,7) by engagement with a locking ring (11) which is also enclosed by the ball part (6,7). The ball part (6,7) is cast into a polymer material (3) whereby the end of the spindle (8) in the base part (20) is efficiently enclosed and closed from access of impurities, filth or bacteria. The machine foot (1) can thereby be cleaned by external washing only and is therefore especially suited for application in environments, which have high demands for hygiene and e.g. demand a compliance with the standard "3-A® Sanitary Standard for Machine Leveling Feet and Supports".

13 Claims, 2 Drawing Sheets

U.S. PATENT DOCUMENTS

| | | | | |
|---|---|---|---|---|
| 6,742,750 | B2 * | 6/2004 | Burr | 248/188.4 |
| 6,938,872 | B2 * | 9/2005 | Nygaard | 248/677 |
| 7,314,206 | B2 * | 1/2008 | Lee et al. | 248/655 |
| 2004/0135045 | A1 * | 7/2004 | Larson | 248/188.1 |
| 2004/0135057 | A1 | 7/2004 | Nygaard | |
| 2006/0279032 | A1 | 12/2006 | Chen | |

FOREIGN PATENT DOCUMENTS

| | | |
|---|---|---|
| FR | 2538078 A | 6/1984 |
| WO | 2006/039924 A | 4/2006 |

* cited by examiner

MACHINE FOOT

BACKGROUND

The invention relates to a method for construction and manufacturing of machine feet, which consist of a spindle that can in the top be fastened to a machine, which is to be supported and which in the bottom is seated in a base part, where the spindle can be angled in relation to the base part at the end part of the spindle, which is seated in the base part, and is enclosed in a ball part, which consists of a lower part and an upper part where the end of the spindle is secured in the ball part via a locking ring, which is in engagement with the spindle end and which is placed inside the ball part.

The invention furthermore relates to a machine foot, which consists of a spindle, which in the top can be fastened to a machine, which is to be supported and which in the bottom is seated in a base part where the spindle can be angled in relation to the base part.

From DE 3437073 a method and a machine foot is known, which consists of a spindle, which in the top can be fastened to a machine, which is to be supported and which is in the bottom seated in a base part where the spindle can be angled in relation to the base part. The spindle is mounted in a ball part, which can be moved in relation to an open hemisphere part mounted in the lower part of the machine foot.

It has been found, however that there are some drawbacks of this known technique since filth and bacteria can get into the machine foot and accumulate between the ball or sphere which encloses the end of the spindle and the hemisphere part in the base part.

The known technique from DE 3437073 can therefore not be applied in applications which have high demands for hygiene since impurities or filth such as bacteria can easily accumulate between the movable ball and the fixed hemisphere part.

If the internal area of a machine foot has been polluted with e.g. bacteria it can only be cleaned efficiently after dismantling and separation which is obviously highly time demanding and costly.

In many lines of business, which e.g. manufacture or process foodstuffs or produce medicine or products, which must be sterile, there are increasing demands for the hygiene of the whole manufacturing process.

This is reflected in continuously increasing demands for the hygiene including the cleaning friendliness of the devices and machines which are used and therefore also the machine feet which support the machines.

As an example of this the demands can be mentioned which are specified for machine feet in:

"3-A® Sanitary Standard for Machine Leveling Feet and Supports"
Standards Developing Organizations
3-A Sanitary Standards, Inc. (3-A SSI)
In Collaboration With
United States Public Health Service
United States Food and Drug Administration
United States Department of Agriculture
European Hygienic Engineering & Design Group The stated hygiene standard is implemented with validity from the 1 Dec. 2006.

According to the new standard, the hitherto known machine feet including constructions as stated in e.g. DE 3437073 can no longer be approved for application or use in applications with critical hygiene demands.

It is therefore an object of the invention to improve the known method and machine foot and application.

SUMMARY OF THE INVENTION

The object of the invention is achieved by a method which is characterized in that the ball part is cast into a polymer such as a rubber.

By casting the ball part which encloses the end of the spindle into a polymer, filth and bacteria are prevented from accumulating in the internal part of the machine foot.

Further preferred embodiments of the method are described more fully below.

As mentioned the invention also relates to a machine foot.

This machine foot is characterized in that the end part of the spindle which is seated in the base part is enclosed in a ball part which consists of a lower part and an upper part and that the end of the spindle is fastened to the ball part via a locking ring, which is engaged to the end of the spindle and which is placed inside the ball part, and that the ball part is cast into a polymer such as a rubber.

It hereby becomes possible to apply or use machine feet which efficiently prevent impurities and filth from accumulating in the internal side of the machine foot whereby the machine feet are easily cleaned effectively by external washing.

BRIEF DESCRIPTION OF THE DRAWINGS

The invention will now be explained further with reference to the drawings, in which.

DETAILED DESCRIPTION OF THE INVENTION

Figure 1:
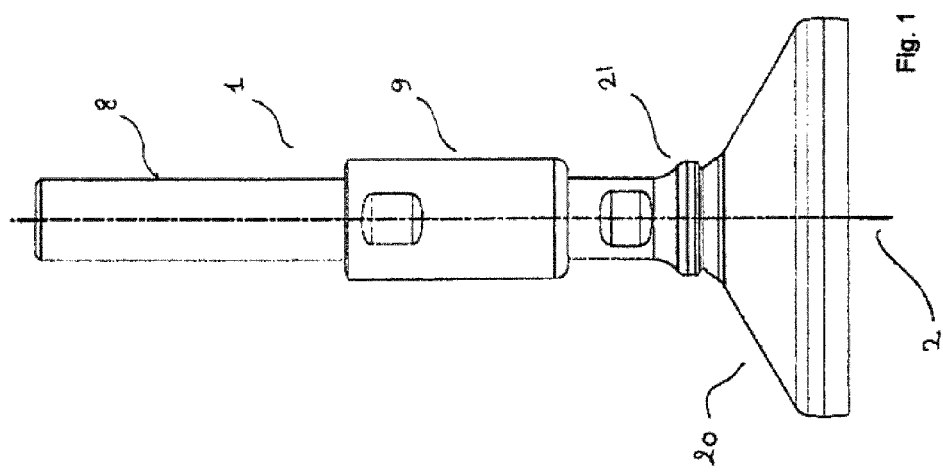
FIG. 1 shows a machine foot with a stated cross sectional line.

In FIG. 1 is with 1 shown a machine foot manufactured according to the invention consisting of a spindle 8, which via a sleeve 21 is in contact with a base part 20.

In FIG. 1 is also shown a cross sectional line 2.

Figure 2:
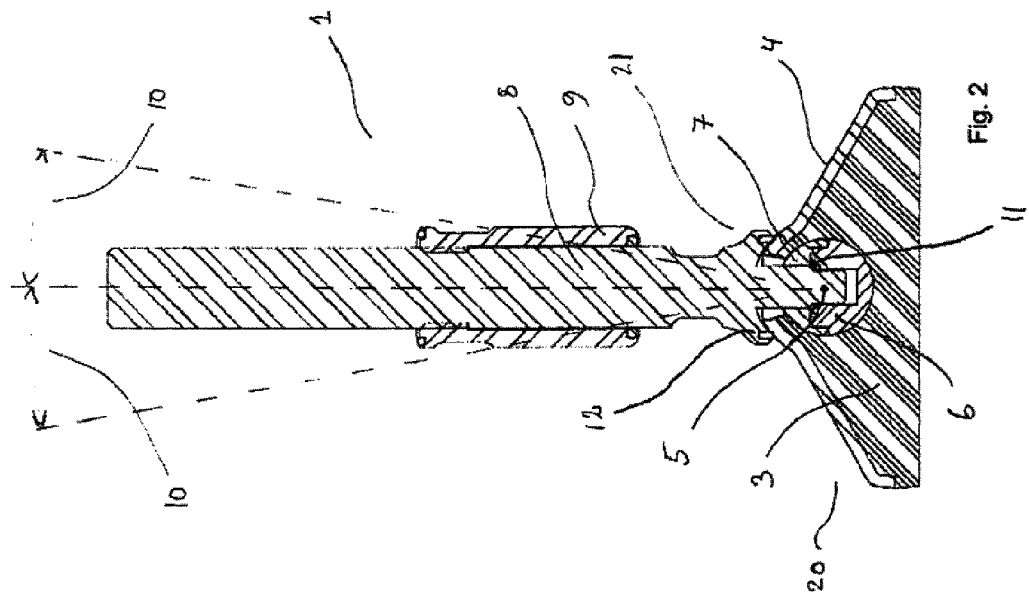
FIG. 2 shows the same machine foot as FIG. 1 but in a sectional view.

FIG. 2 shows the same machine foot as FIG. 1 but now depicted in a section stated from the cross sectional line 2 from FIG. 1.

The spindle 8 is provided with a case 9 with internal thread, which matches the external thread of the spindle.

The case 9 is used for tightening against the machine which is to be supported and to which the machine foot is fastened by screwing in the top of the spindle 8.

The lower part of the spindle 8 is inserted in the base part 20 and seated in a ball part 6,7, which consists of an upper part 7 and a lower part 6.

The ball part 6,7 has a center shown with 5.

The base part 20 consists of a polymer 3, which encloses the ball part 6,7 and which thereby efficiently eliminates cavities in the base part 20.

Hereby it is thus prevented that impurities and bacteria can accumulate in the internal part of the base part 20.

The top of the base part 20 consists of a cover plate 4 preferably manufactured from a rust-proof material.

The upper part 19 of the cover plate 4 is shaped as part of a ball surface, which matches a complementary internal shape of the sleeve 21 on the spindle 8.

The shape complementary ball surfaces of respectively the base top 4 and the internal surface of the sleeve 21 has center 5, which is identical to center 5 for the ball part 6, 7, which encloses the end of the spindle 8 in the base part 20.

By having a joint center 5 for the mentioned complementary ball surfaces from the spindle sleeve 21, the base top 4 and the ball part 6,7 it is achieved that the spindle 8 can be angled in relation to the base part 20 in angles shown with 10, which is preferably up to ten degrees without the center of the ball part 6,7 being moved.

When the spindle 8 is angled 10 in relation to the base part 20 the ball part 6,7 is thus turned around its center 5 in a movement with low friction in relation to or is easily followed by, the elastic enclosing polymer 3 which can e.g. be a rubber.

The lower part of the spindle 8, which is enclosed by a ball part 7 is fastened in the ball part 6,7 via a locking ring 11, which is in friction based engagement with the end of the spindle 8.

The spindle 8 is in the area where there is engagement with the locking ring 11 shaped with parallel tracks for appropriate contact to the locking ring 11.

Between the sleeve 21 and the base part 20 is mounted a sealing 12, which is preferably cylindrical and is preferably manufactured from a thermoplastic polyurethane.

The cylindrical shape of the sealing 12 instead of e.g. an O-ring ensures that the sealing 12 stays in the same shape with angling 10 of the spindle 8 in relation to the base part 20 whereby the sealing between spindle 8 and base part 20 remains intact independently of the angling 10.

Figure 3:
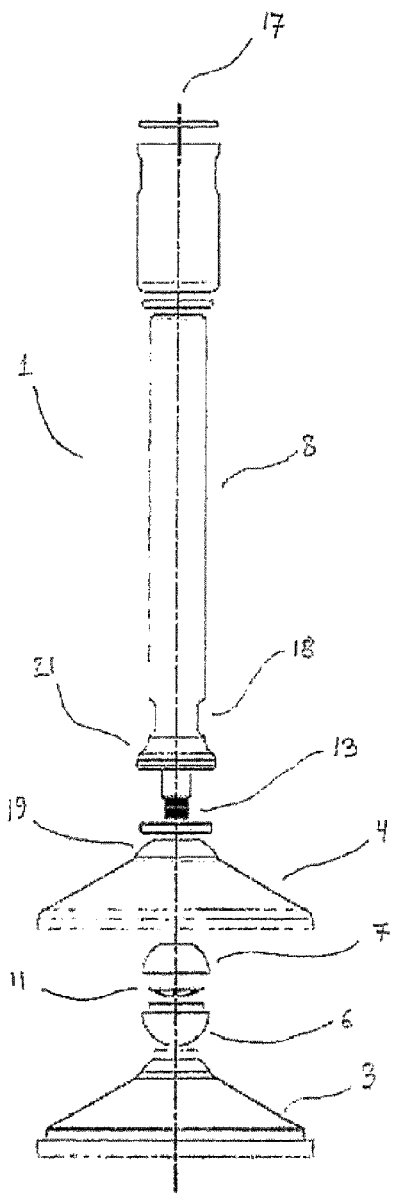
FIG. 3 shows a dismantled machine foot with a stated cross sectional line.

In FIG. 3 is shown a dismantled machine foot 1 with a shown cross sectional line 17.

The spindle 8 ends in a part 13, which is provided with parallel tracks for interaction with a locking ring 11, which fastens the end 13 in a ball part, which consists of an upper part 7 and a lower part 6.

The spindle 8 can be clicked into the locking ring 11 whereby the spindle 8 is fastened in a closed position in relation to the base part 20 even though the load on the machine foot 1 decreases or is removed completely.

Figure 4:
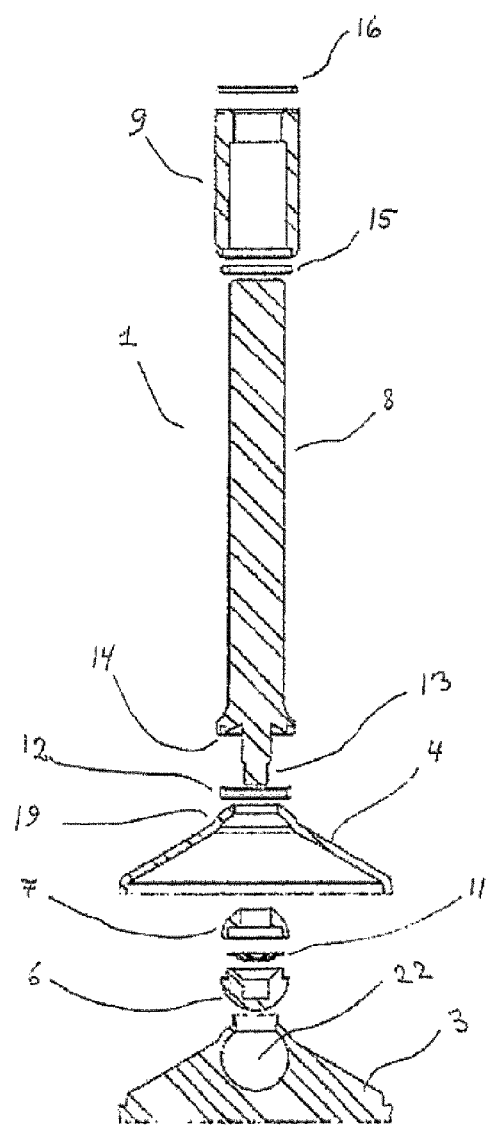
FIG. 4 shows the same dismantled machine foot as in FIG. 3 but in a sectional view.

FIG. 4 shows the dismantled machine foot 1, which is depicted in FIG. 3 in a section shown with the plane 17 drawn into FIG. 3.

The upper ball part 7 is shaped with an opening in the top for insertion of the spindle end 13.

The upper ball part 7 has furthermore an internal shape such that there is room for a locking ring 11, which by engagement with the spindle end 13 fastens the spindle 8 to the upper ball part 7.

The upper ball part 7 is matched and complemented by the lower ball part 6, which is internally shaped in a way that creates room for the end 13 of the spindle 8.

The upper ball part 7 and the lower ball part 6 are shaped with tolerances such that they by assembly squeeze appropriately around both the end of the spindle 13 and mutually and thereby efficiently enclose the end of the spindle 13.

In FIG. 4 is seen a cavity 22 in the polymer material 3, which after assembly of the machine foot 1 efficiently encloses the ball part 6,7 such that there is no cavity in the internal area of the machine foot 1.

It can furthermore be seen in FIG. 4 that the case 9 in the ends is provided with sealings 15 and 16, which thus enclose the case and prevent impurities from reaching the interior part of the case 9.

For the sealings 15 and 16 are preferably used rubber O-rings.

The ball parts 6 and 7 are preferably manufactured from a polymer material consisting of a plastic.

Machine foot 1 constructed and manufactured according to the invention, which can fulfil the demands from "3-A® Sanitary Standard for Machine Leveling Feet and Supports" and can thereby with advantage be used in applications where the standard has to be followed.

The invention claimed is:

1. A method for constructing and manufacturing a machine foot (1) for use in sanitary locations comprising:
   providing a spindle (8) that has a top which can be fastened to a machine to be supported, and a bottom which has an end part;
   providing a ball part (6,7), having a ball shape, the ball part comprised of a lower portion (6) shaped internally for receiving the spindle end part therein, and a matching upper portion (7) having a through hole for passing the spindle end part therethrough for seating the end part within the ball part;
   providing a locking ring between the upper ball portion and the lower ball portion, inside the ball part (6,7), the spindle end part having tracks for engaging the locking ring and fixing the spindle end part to the locking ring and upper ball portion;
   casting the ball part including the locking ring therein in an elastomeric polymer (3), forming a base part (20) which encloses the ball part therein, the ball part being rotatable within the base part;
   assembling the machine foot by inserting the spindle end part into the ball part enclosed in the base part, until the locking ring engages the tracks on the spindle end part, thereby fixing the spindle to the ball part, the ball part being rotatable within the base part such that the spindle (8) can be angled (10) in relation to the base part (20) by moving the top of the spindle (8);
   providing a cover plate (4) which forms a top of the base part, the cover plate having an upper portion (19) shaped as part of a ball surface; and,
   providing a sleeve (21) on the spindle (8) having an internal shape complimentary to the shape of the upper portion (19) of the cover plate (4).

2. The method according to claim 1 further comprising providing a center (5) of the ball part (6,7) within the base part which coincides with a center for angling (10) the spindle (8) in relation to the base part (20).

3. The method according to claim 1 further comprising mounting a seal (12) between the base part (20) and the spindle (8).

4. The method according to claim 3 further comprising providing the seal (12) in a cylindrical form and making the seal from a thermoplastic polyurethane.

5. The method according to claim 1 further comprising:
   providing a case (9) for the spindle having an internal thread for fastening the spindle (8) to the machine; and,
   sealing each end of the case (9) with seals (15,16).

6. The method according to claim 5 wherein the seals (15,16) are polymer O-rings.

7. A machine foot (1) comprising:
   a spindle (8) that has a top which can be fastened to a machine to be supported, and a bottom which has an end part;
   a ball part (6,7) having a ball shape, the ball part having a lower portion (6) shaped internally for receiving the spindle end part therein, and an upper portion (7) having a through hole for passing the spindle end part therethrough for seating the end part within the ball part
   a locking ring located between the upper ball portion and the lower ball portion, the locking ring residing inside the ball part (6,7);

the spindle end part having tracks for engaging the locking ring and fixing the locking ring and upper ball portion to the spindle end part, the ball part including the locking ring being cast in an elastomeric polymer (3), the elastomeric polymer formed into a base part (20) which encloses the ball part therein, the ball part being rotatable within the base part, the spindle end part (13) being inserted into the ball part disposed within the base part such that the locking ring engages the tracks on the spindle end part, thereby fixing the spindle to the ball part disposed in the base part, the ball part being rotatable within the base part such that the spindle (8) can be angled (10) in relation to the base part (20) by moving the top of the spindle (8);

a cover plate (4) which forms a top of the base plate, the cover plate having an upper portion (19) shaped as part of a ball surface; and, a sleeve (21) located on the spindle (8) having an internal shape complimentary to the shape of the upper portion (19) of the cover plate (19).

8. The machine foot of claim 7 wherein the ball part is cast within the elastomeric polymer such that a center of the ball part located within the base part coincides with a center for angling of the spindle end part retained therein relative to the base part.

9. The machine foot of claim 7 wherein the base part is made of rubber.

10. The machine foot according to claim 7 further comprising a seal (12) mounted between the base part (20) and the spindle (8).

11. The machine foot according to claim 10 wherein the seal (12) is cylindrical and made from a thermoplastic polyurethane.

12. The machine foot according to claim 7 further comprising:

a case (9) mounted on the spindle and having an internal thread for fastening the spindle (8) to the machine; and, a pair of seals (15, 16) for sealing each end of the case (9).

13. The machine foot according to claim 12 wherein the seals (15,16) are polymer O-rings.

* * * * *

UNITED STATES PATENT AND TRADEMARK OFFICE
CERTIFICATE OF CORRECTION

| | | |
|---|---|---|
| PATENT NO. | : 8,141,841 B2 | Page 1 of 1 |
| APPLICATION NO. | : 12/597933 | |
| DATED | : March 27, 2012 | |
| INVENTOR(S) | : Lars von Lillienskjold and Knud Nygaard | |

It is certified that error appears in the above-identified patent and that said Letters Patent is hereby corrected as shown below:

On the Title Page, item no. 73 should read:

Assignee: NGI A/S

Signed and Sealed this
Fifteenth Day of May, 2012

David J. Kappos
*Director of the United States Patent and Trademark Office*